United States Patent [19]

Diba

[11] 4,341,002
[45] Jul. 27, 1982

[54] TOOL FOR FLEXIBLE TUBE INSTALLATION

[75] Inventor: Keyvan T. Diba, Los Angeles, Calif.

[73] Assignee: Bio-Energy Systems, Inc., Ellenville, N.Y.

[21] Appl. No.: 211,407

[22] Filed: Nov. 28, 1980

[51] Int. Cl.³ .............................................. B23P 19/02
[52] U.S. Cl. ........................................ 29/235; 29/237; 29/280
[58] Field of Search ................... 29/234, 235, 237, 280

[56] References Cited

FOREIGN PATENT DOCUMENTS 1117059 11/1961 Fed. Rep. of Germany ........ 29/235
553085  5/1943 United Kingdom .................. 29/235
742158 12/1955 United Kingdom .................. 29/235

Primary Examiner—James L. Jones, Jr.
Attorney, Agent, or Firm—Charles J. Brown

[57] ABSTRACT

A hand tool for radial installation in openings through the wall of a larger rigid tube of flexible tubes having rigid inner liners in a portion of their length adjacent to the end to be so installed. The tool includes a generally cylindrical elongated handle with an axial tube receiving surface groove. The handle joins a flange having a diameter greater than the handle, and the flange is so shaped as to provide for conveying the flexible tube inward in a first bend and then axially outward in accordance with a second bend. The inner liner acts as a stiffener during insertion and as a lock whereby the flexible tube is compressed between the inner liner and the opening in the larger rigid tube.

4 Claims, 8 Drawing Figures

TOOL FOR FLEXIBLE TUBE INSTALLATION

BACKGROUND OF THE INVENTION (1) Field of the Invention

The invention relates to hand tools for installing flexible tubing in a tight fit within openings in the wall of a larger rigid tube.

(2) Description of the Prior Art

In the prior art, such operations as the invention provides have been accomplished by unaided manual methods. Recently, there has been increased interest in solar energy for water and space heating and consequently there has been considerable engineering effort toward development of economical and efficient solar collectors, most of which rely on the heating of a fluid such as water. For air space heating, a subsequent heat exchanger is employed.

One particularly desirable solar collector structure of low cost and easy installation includes a number of flexible tubes (of a suitable soft plastic material) which may be loosely placed along a roof or other flat surface exposed to the sun. These tubes are connected in parallel between input and output headers which are larger diameter rigid plastic tubes or pipes, for example of PVC or ABS plastic types. As a result, a large effective solar collection area can be achieved economically.

One of the significant manufacturing (or field assembly) steps concerns the insertion of the flexible tubes into holes in the larger, rigid header pipes. Since there are a large number of these connections in such a solar collector structure, it is important that the cost of each connection be minimized. Obviously, any number of connectors are available which would meet the requirements. However, these add considerable cost, even if they are individually relatively inexpensive. Moreover, hand installation is still necessary.

One inexpensive connection structure makes use of an inner liner inserted into the soft, flexible tubing. When the lined end of the flexible tubing is inserted into an opening with an interference fit, the soft material of the flexible plastic tubing is circumferentially gripped between the opening and the liner due to the resulting material compression.

The assembly of the solar collector of the type described is basically a field operation, each installation being more or less customized to the available mounting surface. In the past, the assembly operation has been an unaided hand operation, the liners being hand inserted and the flexible tubing being manually pushed and twisted to force it into place in its corresponding opening in the header pipe. There has clearly been a need for a tool capable of speeding this operation and reducing the manual effort required.

The manner in which the invention responds to the aforementioned need will be understood as this description proceeds.

SUMMARY OF THE INVENTION

The invention comprises a hand held tool having an elongated, generally cylindrical handle with an axial surface groove and an integral head which is basically a flange of larger overall diameter than the handle. The groove becomes a shaped slot within the flange, the shape making it possible to wrap the flexible tube into a shape bending radially inward (first bend) and then axially outward (second bend) projecting from a central axial base essentially coaxial with the extended axial centerline of the handle. The liner is a short length of rigid thin wall tubing having an outside diameter approximately equal to (or very slightly larger than) the nominal flexible tube inside diameter and causes the flexible tubing to seat at the inner extremity of the axial base. The projected flexible tube with liner can then be easily forced into place in the corresponding opening in the wall of the rigid header. Once installed, the tool is readily removed by dislodging the flexible tube laterally from the open sides of the handle groove and shaped flange slot.

A typical embodiment according to the invention will be described in detail as this specification proceeds.

DETAILED DESCRIPTION

Figure 1:
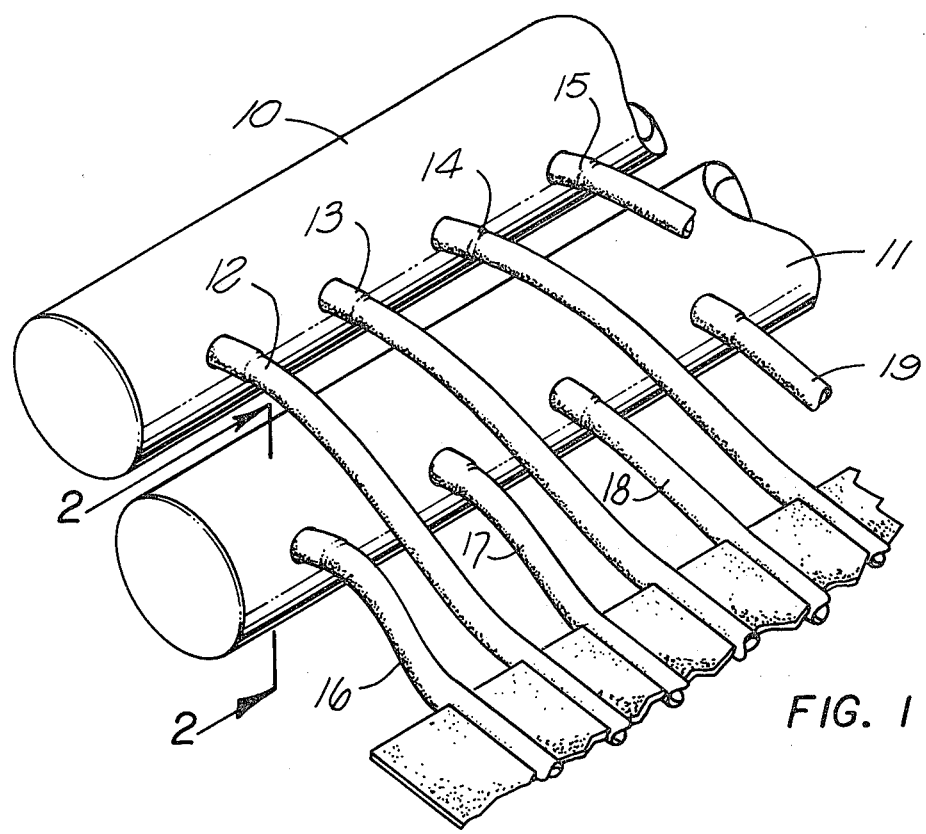
FIG. 1 is a pictorial showing a typical installation of flexible tubing into a rigid header pipe to illustrate the utility of the tool according to the invention.

Referring now to FIG. 1, a typical arrangement in which the invention is particularly useful is depicted. Headers 10 and 11 are typically input and output manifolds. That is, in a solar collector employing this apparatus, header 10 for example, may be an input water supply and header 11 a collector header. The flexible tubes draw from the header 10 in parallel and deliver their sun-warmed outputs into the collector header 11. These flexible tubes may be assumed to be closed loops at an extremity removed from the header connections. That is, 12 and 16 are the input and output ends of an elongated loop of black absorptive flexible plastic material. The same applies to 13 and 17, 14 and 18 and 15 and 19 as shown.

Figure 2:
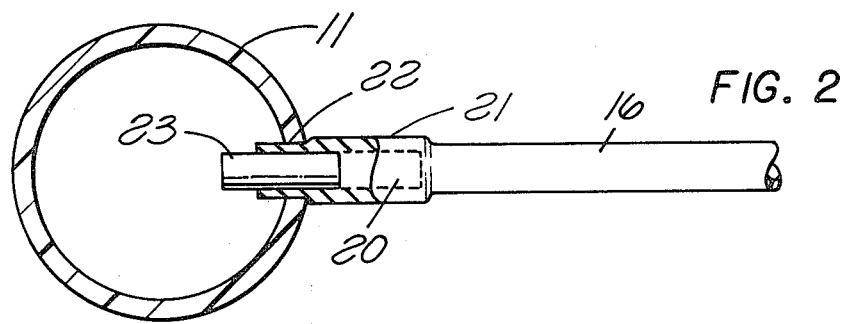
FIG. 2 is a section taken as indicated through FIG. 1.

In FIG. 2, a cross-section through header 10 and flexible tube 16 shows the typical connection of flexible tubing into a header. A rigid, thin-wall liner 20 has been inserted into the end of flexible tube 16 and projects slightly at 23, producing an expanded outside diameter 21. This expansion is somewhat exaggerated in FIG. 2 for clarity.

It will be realized that the compaction at 22 produces a circumferential grip between the opening in header 11 at 22, backed by the liner 20. The appearance of FIG. 2 is essentially the same whether the installation is effected by unaided manual installation or through use of the tool of the invention.

Figure 3:
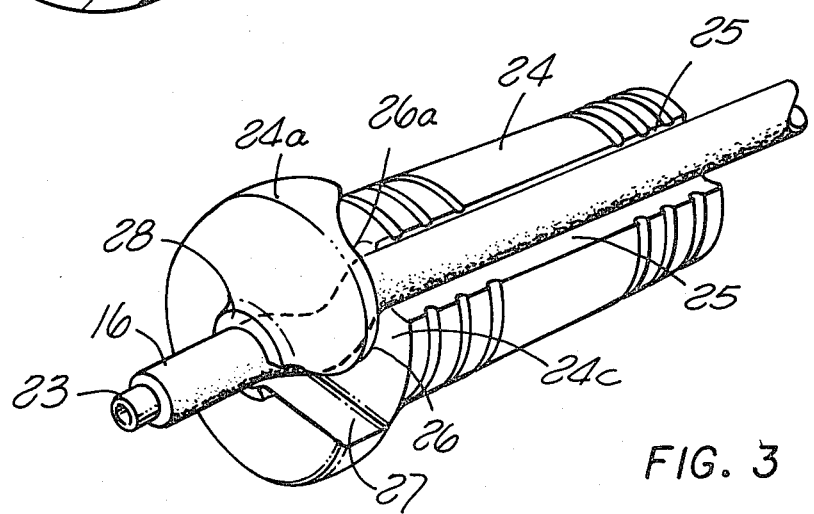
FIG. 3 is a pictorial view of a tool according to the invention with a flexible tube in place ready for installation to produce a connection according to FIG. 1.

Referring now to FIGS. 3, the tool according to the invention is shown pictorially. A generally cylindrical handle or grip 24, preferably of solid metal or other material of suitable strength and hardness, mild steel, aluminum and certain relatively hard moldable plastics are suitable materials from which the tool can be fabricated in accordance with well-known machinery, casting and similar processes.

The tool will be seen to include an integral head portion 24 which forms a shaped flange. An axial groove 25 in the handle 24 provides for emplacement of one of the flexible tubes (16 for example) therein as shown. When hand gripped, the tube 16 tends to be held in place in groove 25.

The flange 24a will be seen to be shaped to provide a double-bend flexible tube shape within the tool as shown in FIG. 3. The flange 24a is formed with a cutout forming surfaces 24c and 27. Tapering and shaping of the portions of the opening thereby generated forms the rounded flange edge 26, that rounding having an equivalent radius of curvature less than that of the overall flange, although the curvature is not necessarily of accurate circular shape. Tapering of the flange thickness at 26a and chamfering of the handle joint at 24c provide for "layin" of the flexible tube as indicated in FIG. 3. Subsequently, the flexible tube is constrained by the surface 27 and the axial base 28 to project axially outward beyond the outer face of flange 24a as depicted in FIG. 3. It is then ready for insertion into the corresponding header opening with axial manual force and a minimum of twisting motion.

Figures 4, 6:
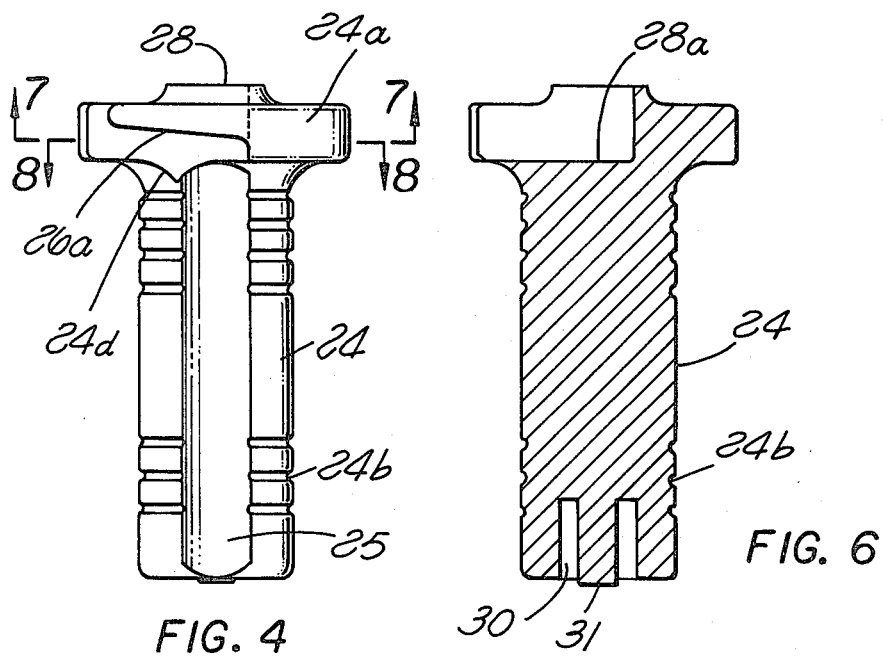
FIG. 4 is a lateral view of the tool of FIG. 3.
FIG. 6 is a section taken through FIG. 5 as indicated.

FIG. 4 is a lateral view of the tool of the invention taken normal to the axial surface groove 25. The circumferential grooves (of which 24b is a typical one) are merely grip aids, however other surface treatments of the handle 24 could be employed for the same purpose. In FIG. 4, the nature of the shaping of flange 24a is more evident. Note chamfered surfaces 24d and 26a. In cooperation with FIG. 5, the flange end view of FIG. 4, the flexible tube passage behind the nose 26 will be clearly understood as these figures relate to FIG. 3.

Figure 5:
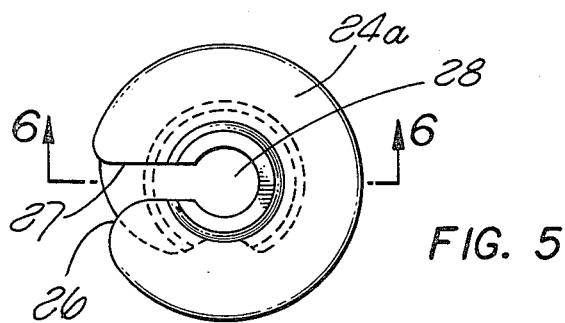
FIG. 5 is a flange (head portion) end view of the tool of FIG. 4.

The surfaces and openings of FIG. 5 and FIG. 4 are readily related to FIG. 3.

The axial section of FIG. 6 shows two additional structural features of importance, one of these namely 28a, is the bottom of the axial bore 25. Against this bottom 28a, the liner 20 tends to abut through the second bend through the flexible tube wall thickness.

The other feature depicted in FIG. 6 is the annular bore 30 in the end of handle 24 opposite flange 24a. This annular bore produces a pedestal 31 of circular cross-section and diameter such as to fit within the inside diameter of rigid liner 20. A predetermined length of that liner may then be inserted into the end of a flexible tube such as 16 (typical) before the header insertion step is undertaken.

Once the insertion has been made, the tool is forced from the tubing laterally in a manner which is substantially the reverse of the lay-in process.

Figure 7:
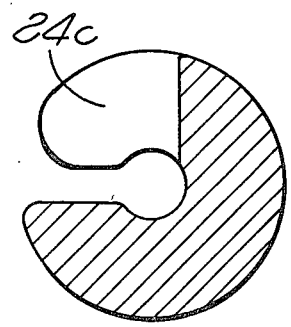
FIG. 7 is a section taken through FIG. 4 as indicated.
Figure 8:
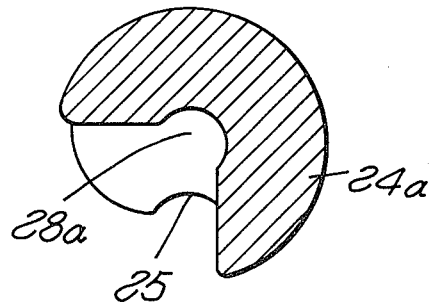
FIG. 8 is a section taken through FIG. 4 as indicated.

The additional sectional view of FIG. 7 and FIG. 8 are self-explanatory when related to FIG. 4.

Modifications and Variations on the described structure will suggest themselves to those of skill in the art, and accordingly, it is not intended that the scope of the invention should be regarded as limited to the precise configuration of the drawings and this description.

I claim:

1. A hand tool for radial installation of a flexible tube having rigid inner liner within a first predetermined length from a first end of said flexible tube, through an opening of circular cross-section in the wall of a rigid tube of larger size, comprising:
   a generally cylindrical, elongated handle being a central axis;
   a head portion integral with said handle at a first axial end thereof, said head portion comprising a flange of diameter greater than that of said handle and an axial bore substantially concentric with said central axis to a depth at least equal to the axial dimension of said flange, said bore being of a diameter at least equal to the outer diameter of said flexible tubing;
   a surface groove extending over the axial length of said handle from the second end of said handle to said flange, said groove having a cross-sectional shape for containing said flexible tube laid therein;
   first means within said flange comprising a shaped cut-away for leading said flexible tube laid axially in said handle surface groove generally radially inward into alignment with said bore in said head portion, said flexible tube protruding axially from said axial bore by an amount substantially equal to the length of said flexible tube to be inserted into said rigid tube.

2. A tool according to claim 1 further defined in that said shaped cut-away is substantially over a quadrant of said flange at the interface of said handle and said flange and said flange has an outwardly rounded portion over said quadrant of radius less than the overall radius of said flange facilitating the insertion of said flexible tube into said tool.

3. A tool according to claim 1 in which said second end of said handle includes an axial bore of annular cross-section producing a central projection from the depth of said annular bore extending toward said handle second end, said central projection having a diameter insertable into said flexible tube for seating said rigid inner liner in response to axial manual force between said tool and said flexible tube, the larger diameter of said annular bore being equal to said flexible tube outside diameter plus a clearance allowance.

4. A tool according to claim 2 in which said second end of said handle includes an axial bore of annular cross-section producing a central projection from the depth of said annular bore extending toward said handle second end, said central projection having a diameter insertable into said flexible tube for seating said rigid inner liner in response to axial manual force between said tool and said flexible tube, the larger diameter of said annular bore being equal to said flexible tube outside diameter plus a clearance allowance.

* * * * *